(12) United States Patent
Lin

(10) Patent No.: US 7,870,819 B2
(45) Date of Patent: Jan. 18, 2011

(54) PISTON DEVICE AND MANUFACTURING METHOD THEREOF

(75) Inventor: Cheng Feng Lin, Taipei (TW)

(73) Assignee: Unipoint Electric Mfg. Co., Ltd., Taipei (TW)

( * ) Notice: Subject to any disclaimer, the term of this patent is extended or adjusted under 35 U.S.C. 154(b) by 406 days.

(21) Appl. No.: 12/073,601

(22) Filed: Mar. 7, 2008

(65) Prior Publication Data

US 2009/0223364 A1    Sep. 10, 2009

(51) Int. Cl.
*F16J 9/22*    (2006.01)
*F02F 5/00*    (2006.01)

(52) U.S. Cl. .......................................... 92/248; 92/255

(58) Field of Classification Search ................. 92/71, 92/248, 249, 255, 258, 260
See application file for complete search history.

(56) References Cited

U.S. PATENT DOCUMENTS

| | | | | |
|---|---|---|---|---|
| 3,885,460 A | * | 5/1975 | Park | 92/249 |
| 3,999,894 A | * | 12/1976 | Nakayama et al. | 92/248 |
| 4,697,992 A | * | 10/1987 | Hatakeyama et al. | 92/251 |
| 5,050,892 A | * | 9/1991 | Kawai et al. | 277/436 |
| 5,772,406 A | * | 6/1998 | Takai | 92/153 |
| 5,941,160 A | * | 8/1999 | Kato et al. | 92/71 |

* cited by examiner

*Primary Examiner*—Thomas E Lazo
(74) *Attorney, Agent, or Firm*—Bacon & Thomas, PLLC

(57) ABSTRACT

A piston device and its manufacturing method are disclosed. The piston device comprises a piston body having at least one annular groove on the side wall of the piston body, and at least one piston ring made of flexible material and mounted in the annular groove. The outer diameter of the piston ring mounted on in the annular groove is larger than the diameter of the piston body, so that the piston ring contacts with the inner wall but the piston body has no contact with the inner wall while the piston device moves reciprocally at the axial direction of the cylinder.

9 Claims, 5 Drawing Sheets

PISTON DEVICE AND MANUFACTURING METHOD THEREOF

FIELD OF THE INVENTION

The present invention relates to a piston device and manufacturing method thereof and more particularly to a piston device with a piston ring made of flexible material.

BACKGROUND OF THE INVENTION

The principle of operation of piston within a cylinder, is driving the piston in oscillating movement to reproduce motive force by combusting the fuel, theoretically, the piston must be completely sealed with the cylinder wall, so the combustion gas can be fully sealed from leaking so as being effectively used to drive the piston. However, the wear resistance between the piston and cylinder wall would be augmented due to the tightness of the oversized piston between the piston and cylinder wall, thus the operation temperature will be correspondingly increased whereas the lubricant adhered is greatly reduced, furthermore, such movement will result in piston scraping so as to shorten effective piston as well as cylinder life. While the piston is undersized by which the piston is not perfectly sealed against cylinder wall, the operation temperature is reduced and maintained at a lower degree, the nitric oxide and sulphur dioxide would be generated due to incomplete combustion, and are mixed with condensed vapor into a hazardous chemical compound which will substantially erode the cylinder.

In the prior arts, to secure piston size fitted within cylinder, numerous experiments would be conducted repeatedly towards varying size of cylinders, in order to determine the precising piston fitted in accordingly, such design will prolong the design cycle thus the cost will increase appreciably.

In view of the drawbacks of the prior art, the inventor of the present invention based on years of experience in the related industry to develop a piston device and its manufacturing method to overcome the drawbacks of the prior art.

SUMMARY OF THE INVENTION

Therefore, it is one of objectives of the present invention to provide a piston device and its manufacturing method to reduce the manufacture cost and complexity.

In a first aspect, the invention provides a piston device which is disposed within a cylinder having an inner wall. The piston device comprises a piston body and at least one piston ring. The piston body has at least one annular groove on the side wall of the piston body. The piston ring is made of flexible material, and mounted in the annular groove. The outer diameter of the piston ring mounted on in the annular groove is larger than the diameter of the piston body, so that the piston ring contacts with the inner wall but the piston body has no contact with the inner wall while the piston device moves reciprocally at the axial direction of the cylinder.

Preferably, the flexible material is Teflon.

Preferably, the surface of the piston ring is coated with Teflon.

In a further aspect, the invention provides a method of manufacturing a piston device. The method comprises the steps of:

i) providing a piston body;
ii) machining at least one annular groove on the side wall of the piston body;
iii) providing at least one piston ring made of flexible material;
iv) mounting the piston ring onto the annular groove;
v) pushing the piston ring to fit the surface of the annular groove tightly.

Preferably, the flexible material is Teflon.

Preferably, the surface of the piston ring is coated with Teflon.

Preferably, the outer diameter of the piston ring mounted on in the annular groove is larger than the diameter of the piston body.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The subject matter regarded as the invention is particularly pointed out and distinctly claimed in the concluding portion of the specification. The invention, both as to device and method of operation, together with features and advantages thereof may best be understood by reference to the following detailed description with the accompanying drawings in which:

DETAILED DESCRIPTION OF THE PREFERRED EMBODIMENTS

The present invention relates to a piston device and its manufacturing method. While the specifications describe at least one embodiment of the invention considered best modes of practicing the invention, it should be understood that the invention can be implemented in many ways and is not limited to the particular examples described below or to the particular manner in which any features of such examples are implemented.

Figure 1:
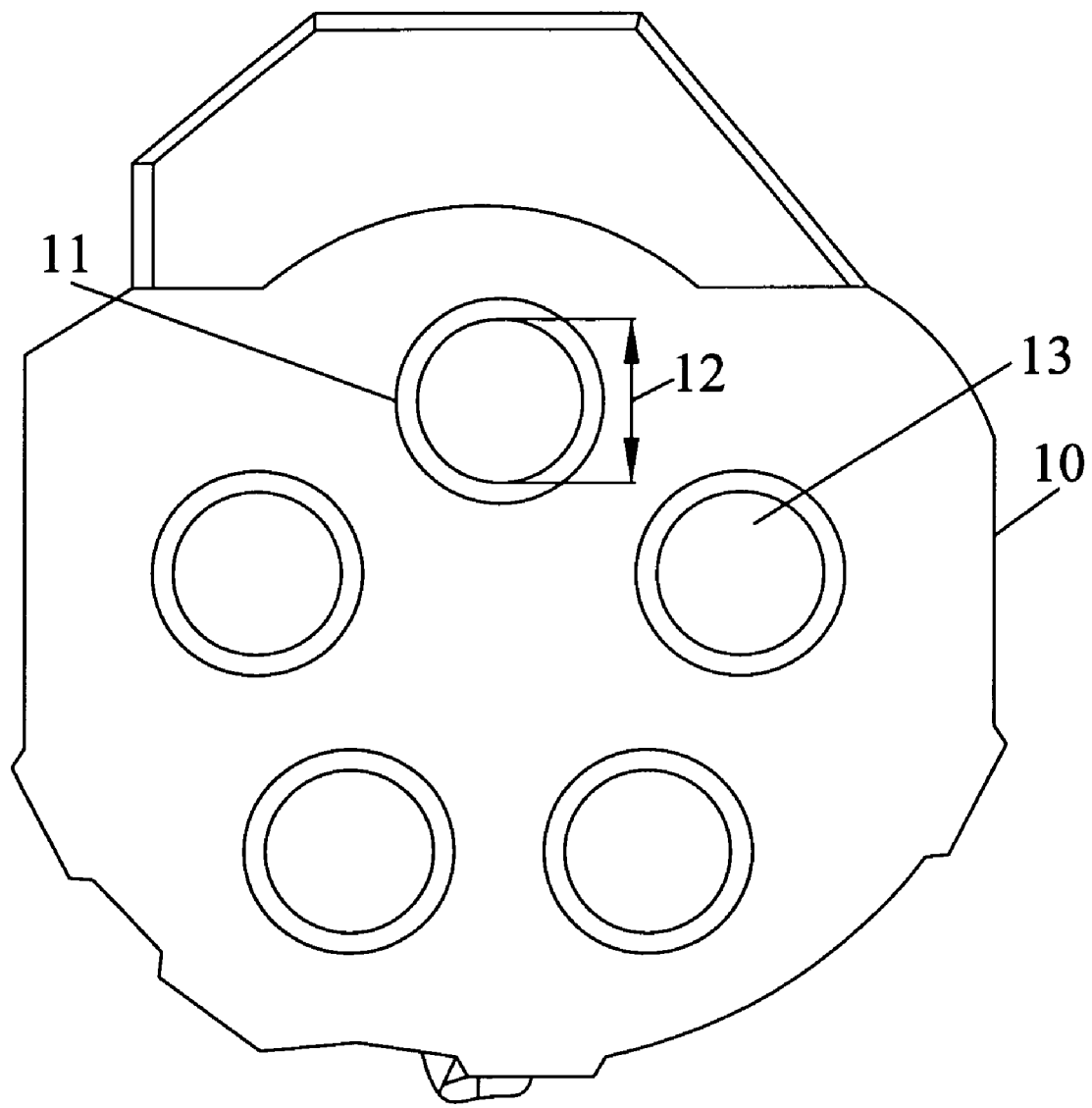
FIG. 1 illustrates the plane of a cylinder.
Figure 2A:
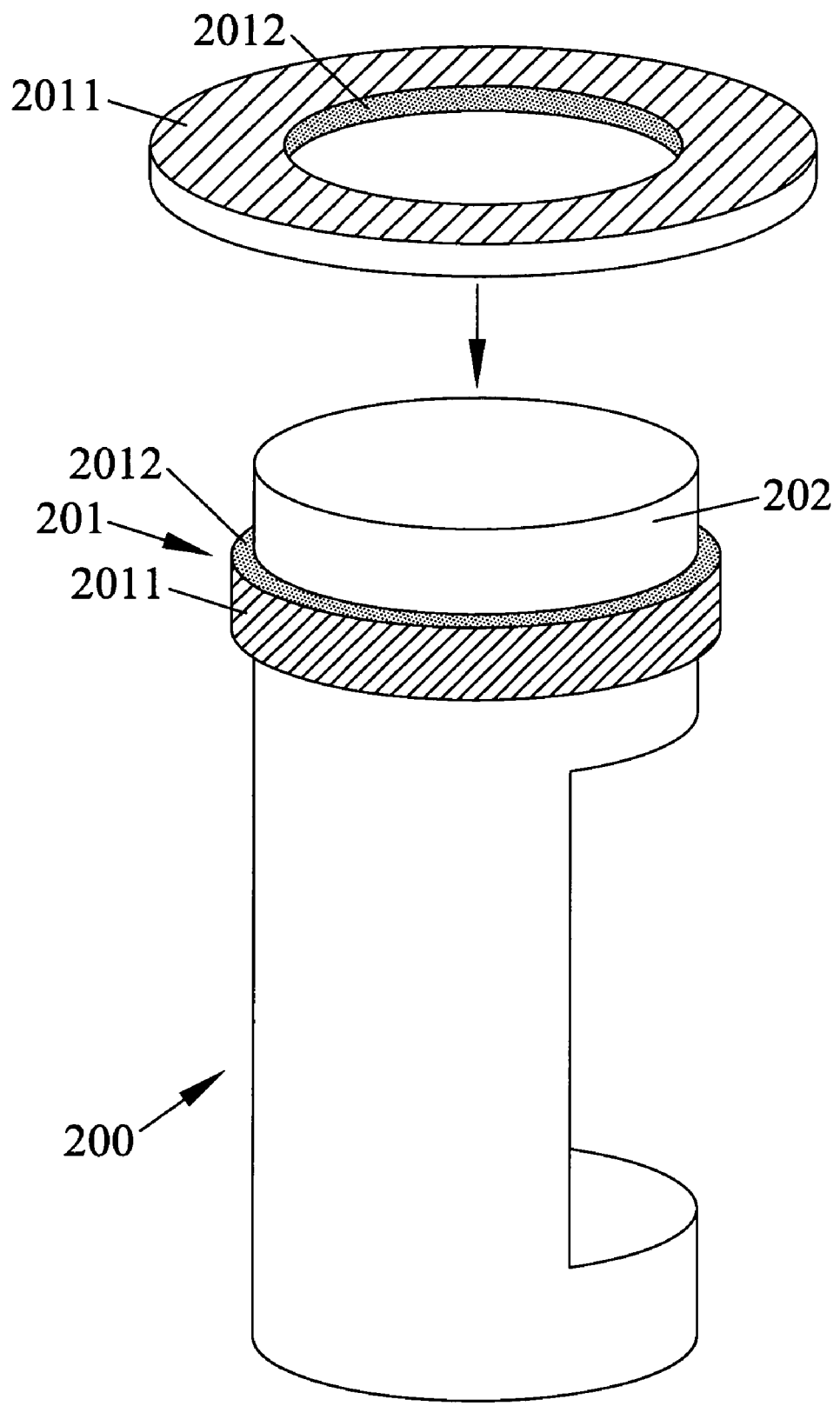
FIG. 2A illustrates a stereo view of the embodiment of piston device in accordance with the present invention.
Figure 2B:
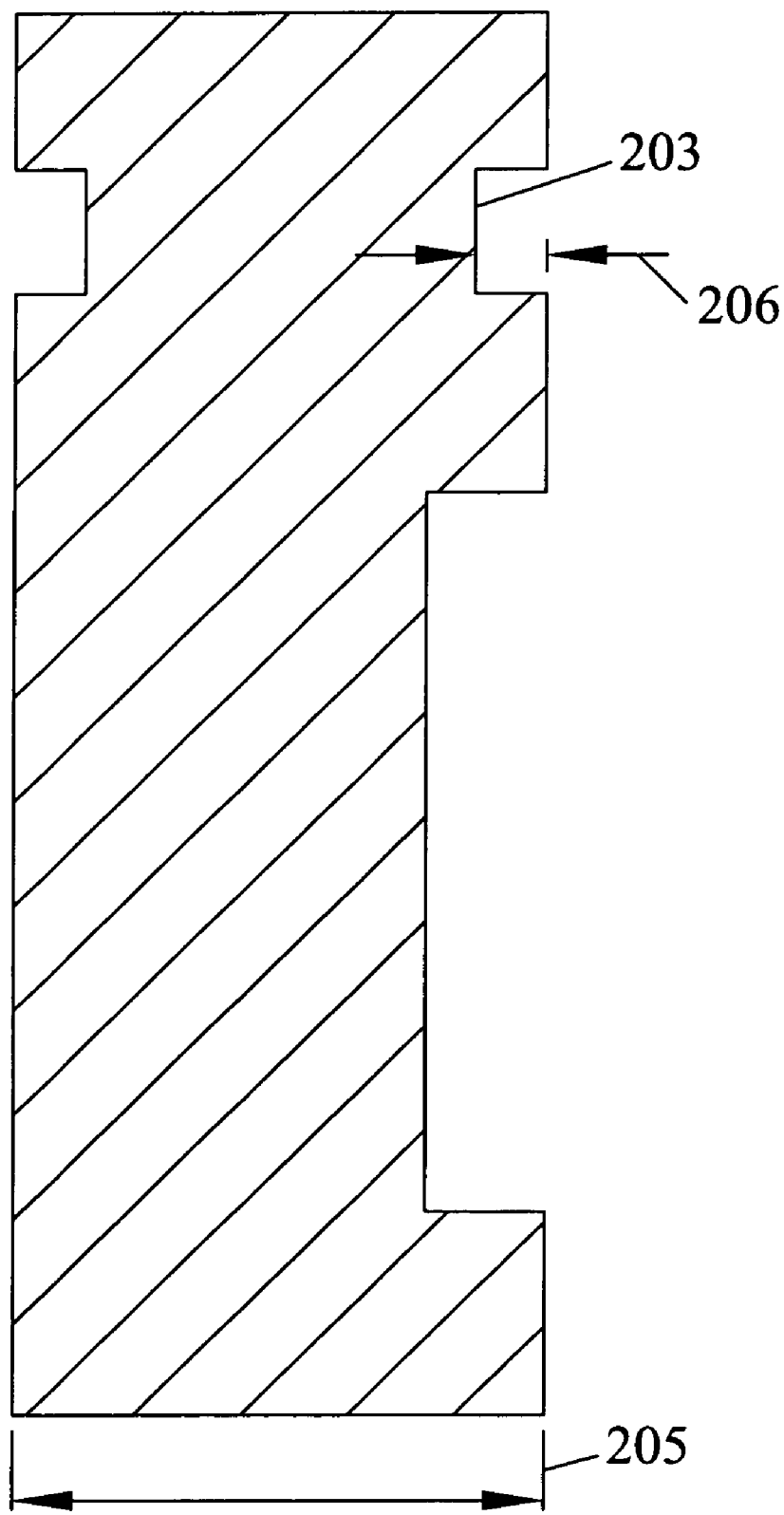
FIG. 2B illustrates a stereo view of the embodiment of piston device in accordance with the present invention.

FIG. 1, FIG. 2A and FIG. 2B illustrate the plane of a cylinder, the stereo view and the sectional view of the piston device in accordance with the invention. In FIG. 1, the cylinder 10 has a plurality of chambers 13 where the piston device is disposed. In FIG. 2A and FIG. 2B, the piston device comprises a piston body 200 and a piston ring 201. The piston body 200 has at least one annular groove 203 on the side wall 202. The piston ring 201 is made of flexible material, so that it can be mounted in the annular groove 203 by the easier process, for example, the surface 2012 of the position ring 201 is mounted onto the annular groove 203 first, and then the surface 2011 of the position ring 201 is pushed so that the piston ring 201 can fit the annular groove 203. The outer diameter of the piston ring 201 mounted on in the annular groove 203 is larger than the diameter 205 of the piston body 200, so the piston ring 201 contacts with the inner wall 11 of chamber 13 but the piston body 200 has no contact with the inner wall 11 while the piston device moves reciprocally at the axial direction of the cylinder 10. Preferably, the thickness of the piston ring 201 is larger than the height 206 of the annular groove 203.

Therefore, the piston device can just contact with inner wall 11 through piston ring 201 during operation, so only piston ring 201 is required to apply a wear resistance process. Preferably, the flexible material can be Teflon® (polytetrafluoroethylene, PTFE), or the surface of the piston ring 201 can be coated with Teflon (polytetrafluoroethylene, PTFE). Besides, for better effect, the design of the piston device preferably matches the following formula:

$$A \pm E = B \pm G + 2*D$$

$$C \pm F = A \pm E - 0.1$$

Wherein A represents the inner diameter of said cylinder, B represents the diameter of said annular groove, C represents the diameter of said piston body, and D represents the thickness of said piston ring. E, F, and G represent the tolerance of A, C and B respectively. Preferably, E is 0.05 mm, F is 0.05 mm, and G is 0.01 mm.

Figure 3:
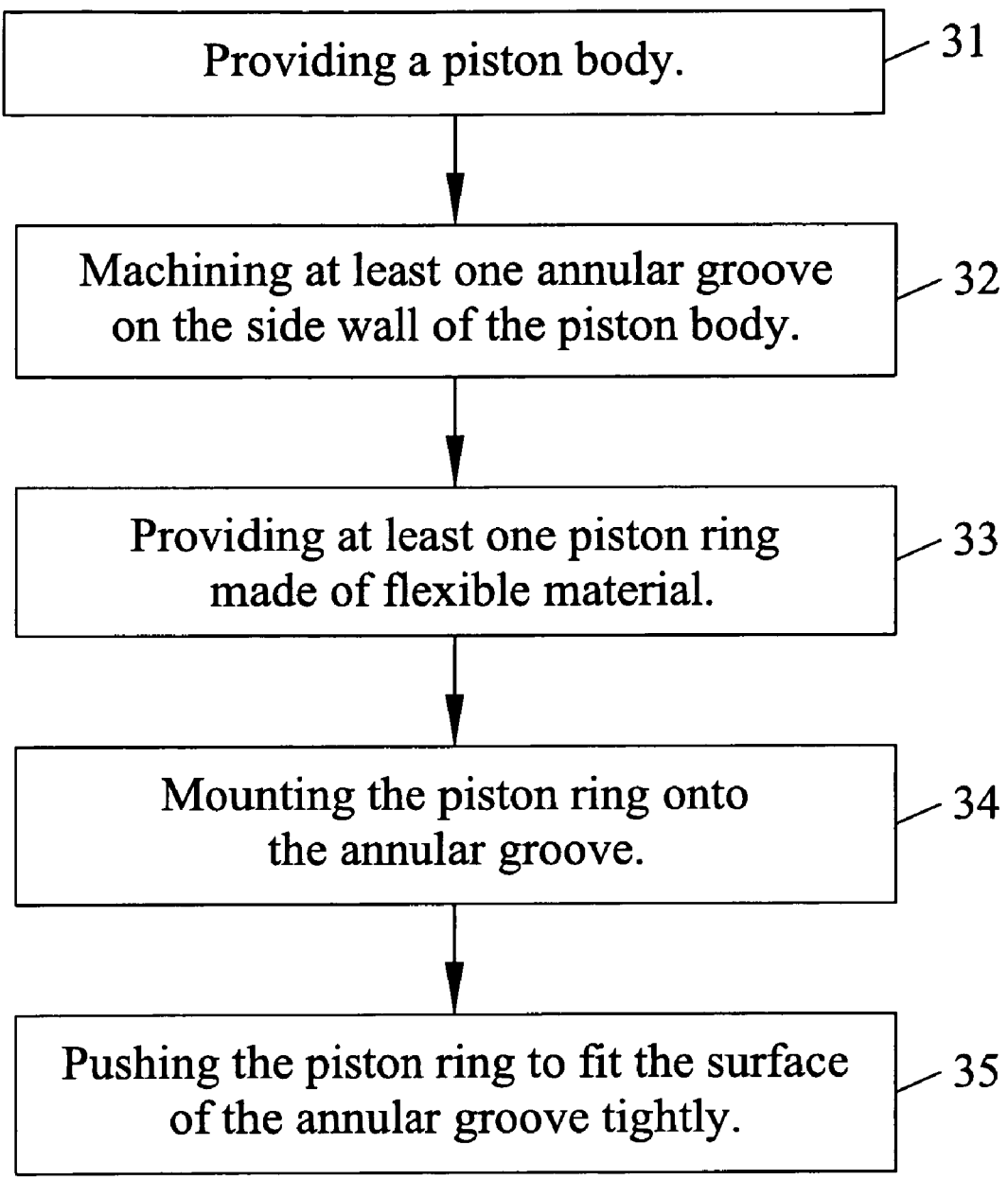
FIG. 3 illustrates a flowchart of the method of manufacturing a piston device in accordance with the present invention.

FIG. 3 illustrates a flowchart of the method of manufacturing a piston device in accordance with the present invention. The method included the following steps of:

step 31: providing a piston body.

step 32: machining at least one annular groove on the side wall of the piston body.

step 33: providing at least one piston ring made of flexible material. Preferably, the thickness of the piston ring is larger than the height of the annular groove.

step 34: mounting the piston ring onto the annular groove.

step 35: pushing the piston ring to fit the surface of the annular groove tightly.

Figure 4:
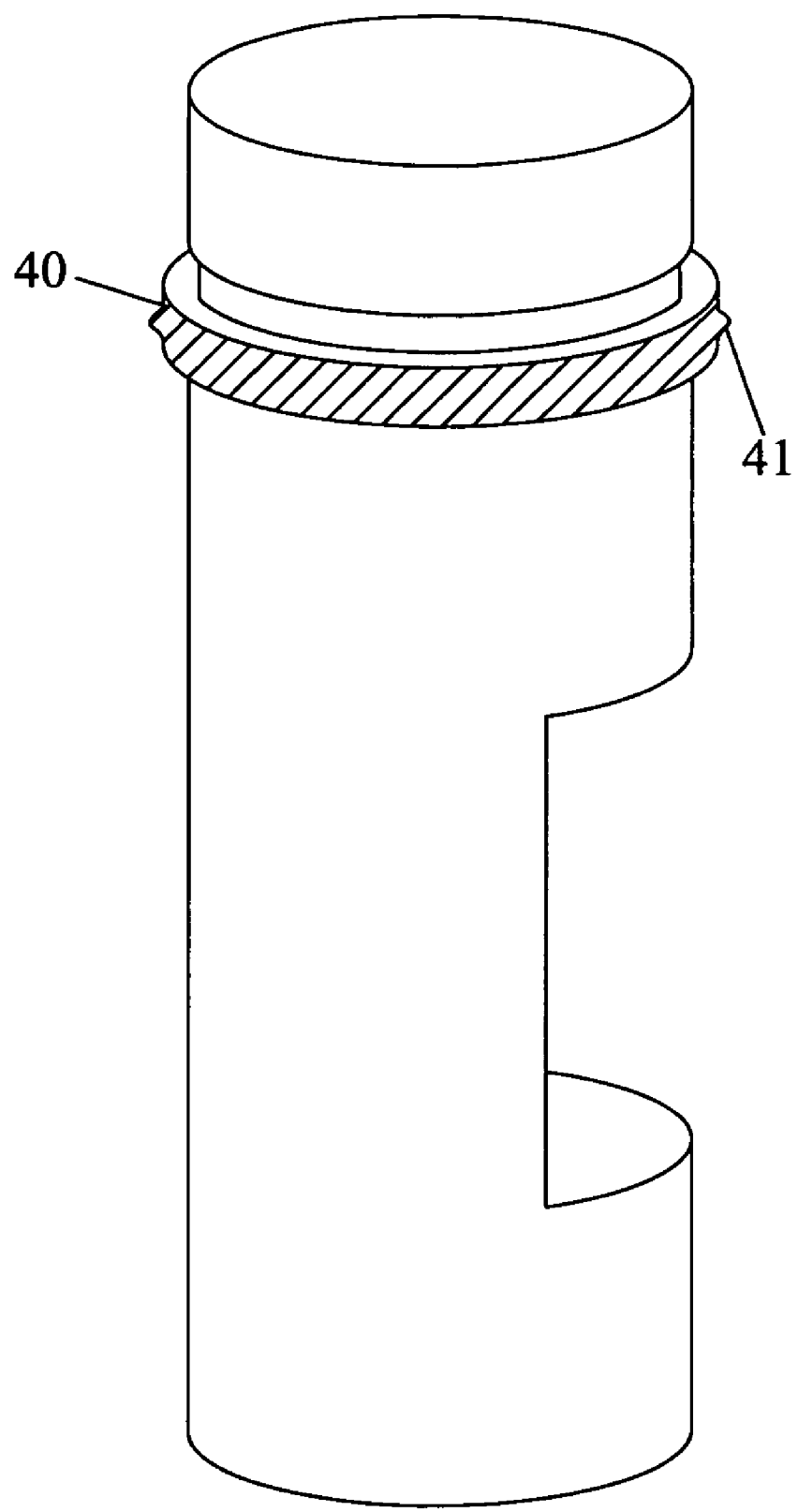
FIG. 4 illustrates a schematic view of the piston device during manufacture.

While step 34 finishes, the piston ring does not fit the surface of the annular groove, as illustrated in FIG. 4, the piston ring 40 has a convex portion 41, so step 35 is performed to push the piston ring 40 to fit the surface of the annular groove tightly.

After the steps of the method are performed, the outer diameter of the piston ring mounted on in the annular groove is larger than the diameter of the piston body. When the piston device manufactured by this method is operated in a cylinder, the piston ring contacts with the inner wall of the cylinder but the piston body has no contact with the inner wall while the piston device moves reciprocally at the axial direction of the cylinder.

By using such piston ring made of flexible material, the manufacture cost and complexity can be reduced. Besides, the piston ring can enhance the sealing capability so as to prevent the combustion gas from leaking from top side and enhance the heat dissipation, i.e. the heat generated while piston device operated within cylinder can be dissipated to cylinder wall through the piston ring.

For example, when the compressor is operated at 4500 rpm, the high pressure is at 11~12 (kg/cm²), the temperature of piston corresponding to different size of B is shown in Table 1:

TABLE 1

| Size of B | Temperature of piston(° C.) | Result |
|---|---|---|
| ψ27.89~ψ27.91 mm | 80~90 | Normal |
| ψ27.93 mm | 105~110 | Higher |
| ψ27.95 mm | 120~130 | middle-high |
| ψ27.96 mm | 130~135 | too high |

TABLE 1-continued

| Size of B | Temperature of piston(° C.) | Result |
|---|---|---|
| ψ27.87 mm | 80~85 | Normal |
| ψ27.85 mm | 70~80 | middle-low |
| ψ27.83 mm | 65~70 | too low |

According to Table 1, when the size of B is the reasonable value which is between 27.89 mm and 27.91 mm, the temperature of the piston is between 80° C. and 90° C. measured during reciprocation in cylinder, this enables the efficient work of the piston. The temperature between 80° C. and 90° C. is called as normal value. When the size of B exceeds the reasonable value, for example 27.93~27.96 mm shown in Table 1, the temperature of the piston measured during reciprocation in cylinder will be higher than the normal value, such as 80° C.~90° C., and cause the piston to expand over size and result in overly wearing of the piston ring. On the contrary, when the size of B is lower than the reasonable value, such as 27.89~27.91 mm, the airtight joint between the piston and the cylinder can not be formed strong and the air leakage may occur, and this will cause the temperature of the piston measured during reciprocation in cylinder to become lower and result in inefficient work of the piston.

When the compressor is operated at 2000 rpm, the inlet pressure is at 1.5~2 (kg/cm²), and the testing time is 5 seconds, the outlet pressure corresponding to different size of B is shown in Table 2:

TABLE 2

| Size of B | Outlet pressure (kg/cm²) | Result |
|---|---|---|
| ψ27.89~ψ27.91 mm | 11~12 | Normal |
| ψ27.93 mm | 14~15 | Middle-high |
| ψ27.95 mm | 15~16 | Middle-high |
| ψ27.96 mm | 17~18 | Too high |
| ψ27.87 mm | 9~10 | Lower |
| ψ27.85 mm | 8~9 | Middle-low |
| ψ27.83 mm | 6~7 | Too low |

According to Table 2, when the size of B is the reasonable value which is between 27.89 and 27.91 mm, the outlet pressure of the piston is between 11 and 12(kg/cm²) measured during reciprocation in cylinder, this will enable efficient work of the piston. The pressure between 11 and 12 (kg/cm²) is called as normal pressure. When the size of B exceeds the reasonable value, for example 27.93~27.96 mm shown in Table 2, the outlet pressure of the piston will be higher than the normal pressure such as 11~12 (kg/cm²) and result in overly wearing of the piston ring. On the contrary, when the size of B is lower than the reasonable value, such as 27.89 and 27.91 mm, the airtight joint between the piston and the cylinder can not be formed strong and the air leakage may occur, and this will cause the outlet pressure to become lower and result in inefficient work of the piston.

These experiment results can explain that the piston device can be operated well if the design of the piston device matches the above-mentioned formula.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A piston device, disposed within a cylinder having an inner wall, said piston device comprising:
   a piston body, having at least one annular groove on the side wall of said piston body; and
   at least one piston ring, made of flexible material, and said piston ring mounted in said annular groove, and the outer diameter of said piston ring mounted on in said annular groove is larger than the diameter of said piston body;
   wherein said piston ring contacts with said inner wall but said piston body has no contact with said inner wall while said piston device moves reciprocally at the axial direction of said cylinder;
   wherein said piston device matches the following formula:

$$A \pm E = B \pm G + 2*D$$

$$C \pm F = A \pm E - 0.1$$

wherein A represents the inner diameter of said cylinder, and B represents the diameter of said annular groove, and C represents the diameter of said piston body, and D represents the thickness of said piston ring, and E, F, G represent the tolerance of A, C, B respectively;
   wherein said B is 27.89-27.91 mm, said E is 0.05 mm, said F is 0.05 mm, and said G is 0.01 mm.

2. A piston device of claim 1, wherein the thickness of said piston ring is larger than the height of said annular groove.

3. A piston device of claim 1, wherein said flexible material is PTFE.

4. A piston device of claim 1, wherein the surface of said piston ring is coated with PTFE.

5. Method for manufacturing a piston device, comprising the steps of:
   providing a piston body;
   machining at least one annular groove on the side wall of said piston body;
   providing at least one piston ring made of flexible material;
   mounting said piston ring onto said annular groove; and
   pushing said piston ring to fit the surface of said annular groove tightly;
   wherein said piston device matches the following formula:

$$A \pm E = B \pm G + 2*D$$

$$C \pm F = A \pm E - 0.1$$

wherein A represents the inner diameter of a cylinder, and B represents the diameter of said annular groove, and C represents the diameter of said piston body, and D represents the thickness of said piston ring, and E, F, G represent the tolerance of A, C, B respectively;
   wherein said B is 27.89-27.91 mm, said E is 0.05 mm, said F is 0.05 mm, and said G is 0.01 mm.

6. Method of claim 5, wherein the thickness of said piston ring is larger than the height of said annular groove.

7. Method of claim 5, wherein the outer diameter of said piston ring mounted on in said annular groove is larger than the diameter of said piston body.

8. Method of claim 5, wherein said flexible material is PTFE.

9. Method of claim 5, wherein the surface of said piston ring is coated with PTFE.

* * * * *